United States Patent
Leyte-Vidal et al.

(10) Patent No.: US 11,156,208 B2
(45) Date of Patent: Oct. 26, 2021

(54) METHOD AND ARRANGEMENT FOR DETECTING A SHADOW CONDITION OF A WIND TURBINE

(71) Applicant: Siemens Gamesa Renewable Energy A/S, Brande (DK)

(72) Inventors: Albert Leyte-Vidal, Orlando, FL (US); Kurt Straub, Oviedo, FL (US); Nakiesa Faraji-Tajrishi, Orlando, FL (US); Pamela S. Caraballo, Orlando, FL (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/625,030

(22) PCT Filed: Jun. 1, 2018

(86) PCT No.: PCT/US2018/035522
§ 371 (c)(1),
(2) Date: Dec. 20, 2019

(87) PCT Pub. No.: WO2019/005419
PCT Pub. Date: Jan. 3, 2019

(65) Prior Publication Data
US 2020/0141386 A1    May 7, 2020

Related U.S. Application Data

(63) Continuation of application No. 15/637,213, filed on Jun. 29, 2017, now abandoned.

(51) Int. Cl.
*F03D 7/02* (2006.01)
*F03D 80/20* (2016.01)
(Continued)

(52) U.S. Cl.
CPC ............. *F03D 7/0264* (2013.01); *F03D 7/04* (2013.01); *F03D 80/20* (2016.05); *G01S 3/7861* (2013.01);
(Continued)

(58) Field of Classification Search
CPC ........ F05B 2270/8042; F05B 2270/805; F05B 2270/806; F05B 2260/821; F05B 2270/30; F03D 7/0264; F03D 7/04; F03D 80/20
(Continued)

(56) References Cited

U.S. PATENT DOCUMENTS

| 4,289,397 A | 9/1981 | Itzkan |
|---|---|---|
| 4,722,599 A | 2/1988 | Fruengel et al. |

(Continued)

FOREIGN PATENT DOCUMENTS

| CN | 105673359 A | 6/2016 |
|---|---|---|
| DE | 19928048 A1 | 12/1999 |

(Continued)

OTHER PUBLICATIONS

International Search Report dated Aug. 31, 2018 corresponding to PCT International Application No. PCT/US2018/035522.
(Continued)

*Primary Examiner* — Charles Reid, Jr.
(74) *Attorney, Agent, or Firm* — Schmeiser, Olsen & Watts LLP

(57) ABSTRACT

A method for detecting a shadow condition from a wind turbine and a system for detecting a shadow condition are provided. An atmospheric condition detected from an atmospheric condition detector is compared to a threshold. From the comparison a determination is made that the atmospheric condition is shadow producing. The shadow condition is detected using the determination.

16 Claims, 2 Drawing Sheets

(51) Int. Cl.
*F03D 7/04* (2006.01)
*G01S 3/786* (2006.01)
*G01S 15/88* (2006.01)
*G01S 17/95* (2006.01)

(52) U.S. Cl.
CPC .......... *G01S 15/885* (2013.01); *G01S 17/95* (2013.01); *F05B 2260/821* (2013.01); *F05B 2270/30* (2013.01); *F05B 2270/805* (2013.01); *F05B 2270/806* (2013.01); *F05B 2270/8042* (2013.01)

(58) Field of Classification Search
USPC ..................................................... 290/44, 55
See application file for complete search history.

(56) References Cited

U.S. PATENT DOCUMENTS

| | | | |
|---|---|---|---|
| 6,133,990 | A | 10/2000 | Miller et al. |
| 6,278,398 | B1 | 8/2001 | Vossiek et al. |
| 6,661,111 | B1 | 12/2003 | Wobben |
| 6,756,934 | B1 | 6/2004 | Chen et al. |
| 7,619,321 | B2 | 11/2009 | Wobben |
| 8,310,075 | B2 | 11/2012 | Sorensen et al. |
| 9,261,075 | B2 | 2/2016 | Li et al. |
| 2001/0043323 | A1 | 11/2001 | Sullivan et al. |
| 2006/0267347 | A1 | 11/2006 | Wobben |
| 2007/0171396 | A1 | 7/2007 | Harris et al. |
| 2009/0033098 | A1 | 2/2009 | Griffith et al. |
| 2010/0198420 | A1 | 8/2010 | Rettger et al. |
| 2010/0295303 | A1 | 11/2010 | Lind et al. |
| 2011/0204629 | A1 | 8/2011 | Sorensen et al. |
| 2013/0073099 | A1 | 3/2013 | Bronicki |
| 2015/0115610 | A1 | 4/2015 | Quinlan |
| 2015/0134251 | A1 | 5/2015 | Bixel |
| 2015/0308406 | A1 | 10/2015 | Li et al. |
| 2016/0146195 | A1 | 5/2016 | Holtom |

FOREIGN PATENT DOCUMENTS

| | | |
|---|---|---|
| DE | 19929970 A1 | 1/2001 |
| EP | 2554836 A1 | 2/2013 |
| WO | WO2004094818 A1 | 11/2004 |
| WO | WO2009030252 A1 | 3/2009 |
| WO | WO 2018/009265 | 1/2018 |

OTHER PUBLICATIONS

Written Opinion dated Aug. 31, 2018 corresponding to PCT International Application No. PCT/US2018/035522.
Non-English Chinese Office Action dated Aug. 3, 2020 for Application No. 201880043577.7.

METHOD AND ARRANGEMENT FOR DETECTING A SHADOW CONDITION OF A WIND TURBINE

CROSS-REFERENCE TO RELATED APPLICATIONS

This application claims priority to PCT Application No. PCT/US2018/035522, having a filing date of Jun. 1, 2018, which is based on U.S. application Ser. No. 15/637,213, having a filing date of Jun. 29, 2017, the entire contents both of which are hereby incorporated by reference.

FIELD OF TECHNOLOGY

The following generally relates to a method and arrangement for detecting a shadow of a wind turbine.

BACKGROUND

A shadow is a dark area which is cast onto a surface when a light source is blocked by an object. Shadow flicker is the pulsating light produced from intermittent shadows. A "shadow flicker" is caused when a rotating devices, such as a wind turbine blade, periodically casts shadows onto a surface. This pulsating light is caused by the passage of the wind turbine blade between the sun and the surface the shadow is cast on. This pulsating light can be a source of discomfort when the shadow flicker enters into the building via an opening, such as a window.

Detecting a shadow condition from the intensity of a direct light measurement being over a threshold is known. The measurement is obtained via a light sensor which is arranged at or proximate to the wind turbine or arranged at the location where the shadow occurs. The wind turbine is shut down after the shadow condition persists over a period of time such as 5 minutes.

Arranging sensors at locations around the wind turbine, such as at 120% intervals, provides that a first sensor may detect direct light and a second sensor will be in a shadowed region. If the difference between the light intensity between the first and second sensors is greater than a predetermined value the shadow condition is met.

Presently shadow detection methods, devices, and systems may benefit from improvements.

SUMMARY

An aspect relates a method and arrangements for shadow detection.

For example, a method of detecting a shadow condition from a wind turbine is provided. The method comprising determining a geometry condition is present which is effective to produce a shadow at a location of concern; comparing an atmospheric condition, detected by an atmospheric condition detector, to a threshold; determining the atmospheric condition is shadow producing from the comparison; and detecting a shadow condition in response to the geometry condition determined to produce a shadow at the location of concern and to the atmospheric condition determined to be shadow producing.

A further example, a shadow detection system comprising an atmospheric condition detector separated from a wind turbine by a distance; and a controller communicatively coupled to the wind turbine by a network and configured for: determining a geometry condition is present which is effective to produce a shadow at a location of concern; comparing an atmospheric condition, detected by an atmospheric condition detector, to a threshold; determining the atmospheric condition is shadow producing from the comparison; and detecting a shadow condition in response to the geometry condition determined to produce a shadow at the location of concern and to the atmospheric condition determined to be shadow producing.

Another example includes a wind turbine farm. The wind farm comprises a plurality of wind turbines; and a shadow detection system for detecting shadows for each of the plurality of wind turbines. The atmospheric condition detector of the shadow detection system may be located remotely at a distance from at least one of the plurality of wind turbines.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION

Some of the embodiments will be described in detail, with reference to the following figures, wherein like designations denote like members, wherein.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

It would be appreciated, by those skilled in the art, that a shadow may occur at a specific location or range or specific locations based on a relationship between a shadow producing element, a light emission from a light source, and the shadow location. To facilitate specific examples, the shadow producing element may be referred to as a blade, a light emission may be referred to as sun light, light source may be referred to as the sun, and the specific location or range of locations may be referred to as location of concern. For example, a shadow may be produced via the sun and the blade but in order for the shadow to occur at location of concern an alignment between sun, blade and the location of concern must take place.

Any condition which influences a shadow to be cast at the location of concern which is based on the alignment between the sun, blade, and location of concern is defined herein as geometry condition. For example, the position of the sun changes during the day and throughout the year. As such, the alignment between the sun, the blade and location of concern changes such that a shadow does not occur at a location of concern at all times. The position of the blades changes as the yaw angle of the turbine changes which may affect a geometry condition. The geometry condition may comprise one or more of the conditions such as positional relationship between the sun, blade and the location of concern. The geometry condition may be further defined by the blade size, location of concern or portion thereof, distance between the wind turbine and the building, turbine yaw angle, blade pitch, elevation of wind turbine blades, and elevation of the location of concern.

Contributing to producing a shadow is the presence of sun light. Even when the geometry condition is such that a shadow may occur at the location of concern, the sun light may not be effective to produce a shadow. For example, the sunlight may be blocked by clouds.

Figure 1:
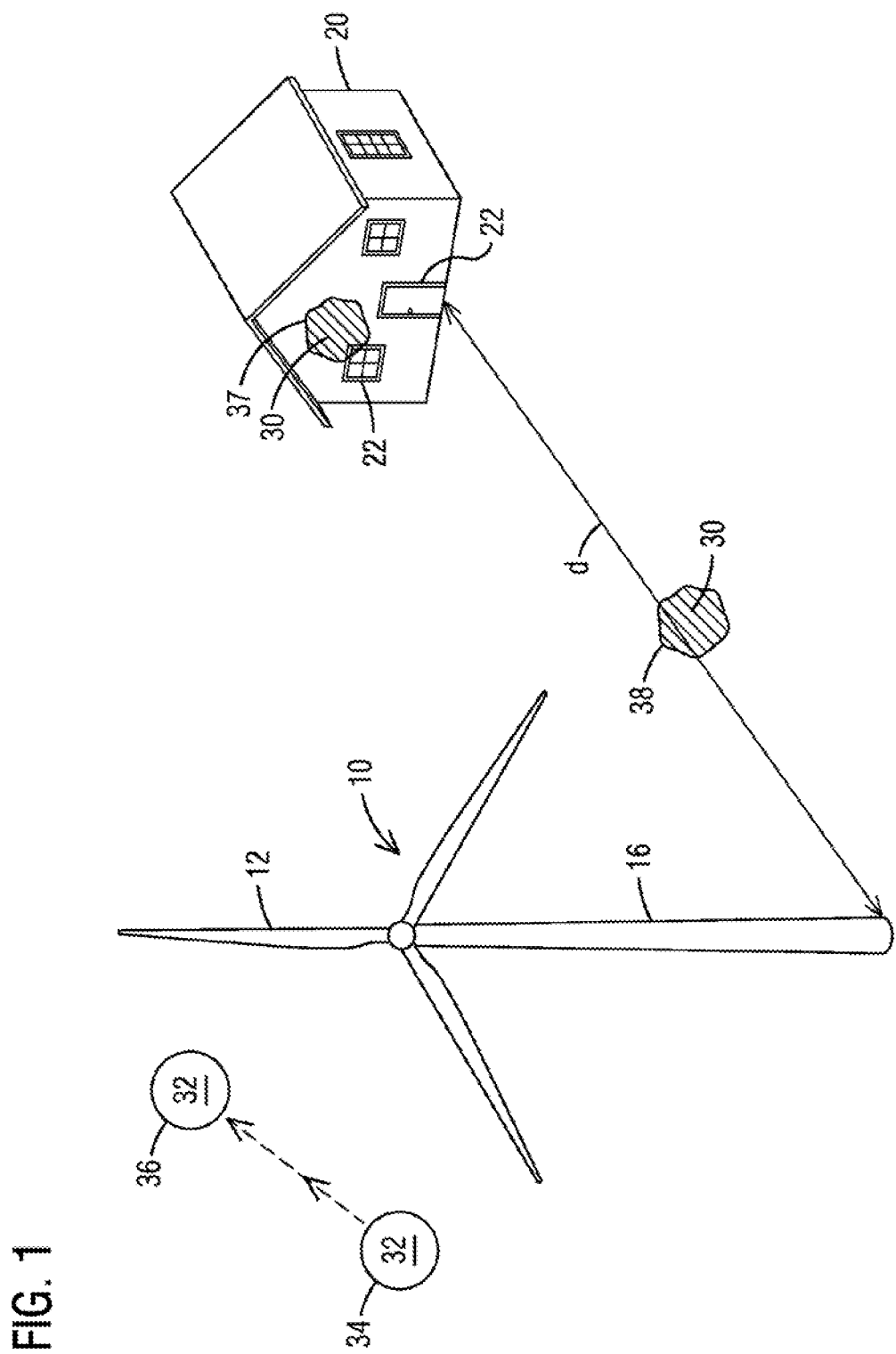
FIG. 1 illustrates a wind turbine arrangement in relation to a building.

By way of an example, FIG. 1 illustrates a wind turbine arrangement in relation to a building 20. The wind turbine 10 is separated by distance d from the building 20. A shadow may be cast by the wind turbine 10, such that the location of shadow 30 is dependent on the position 34, 36 of the sun 32 with respect to the wind turbine 10. When the sun 32 is in a first position 34, such as low on the horizon, a shadow 30 may be cast from the wind turbine 10 onto a first location 37. For example, a shadow 30 cast onto the building 20. When the sun 32 is in a second position 36, such as higher in the sky than the first position 34, a shadow 30 may be cast from the wind turbine 10 onto a second location 38, for example, onto the ground. When the shadow 30 is produced from moving object, such as a blade 12 of the wind turbine 10, versus a stationary object, such as the tower 16, a shadow flicker can be produced. This shadow flicker may cause discomfort when cast on a building 20 and/or into the building 20 via an opening 22.

Figure 2:
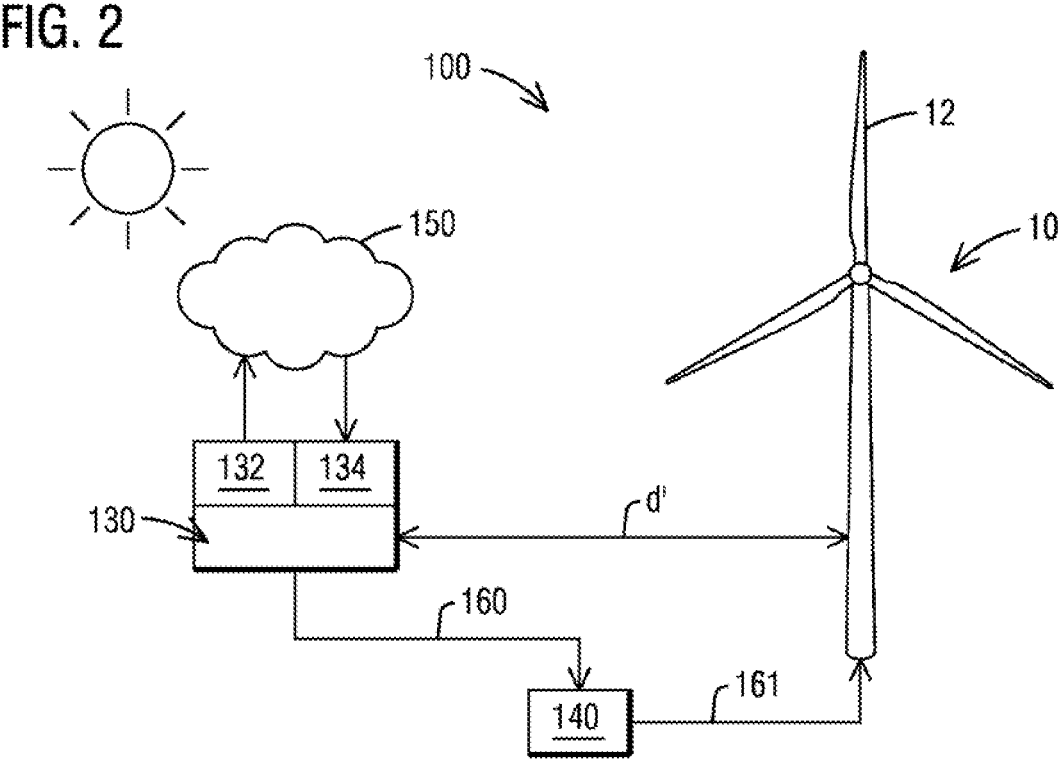
FIG. 2 illustrates a plan view of a wind power system according to an embodiment.

FIG. 2 illustrates a plan view of a shadow detection system 100 according to an embodiment. The shadow detection system 100 comprises the wind turbine 10, as described in FIG. 1. The system comprises an atmospheric condition detector 130, and a controller 140.

The atmospheric condition detector 130 detects atmospheric conditions. For example the atmospheric condition detector 130 may detect one or more of the following atmospheric conditions: amounts of aerosol, aerosol formation, height of the aerosol, amounts of clouds, cloud formation, height of a cloud(s), the structure of the atmosphere, composition of the atmosphere, precipitation, gas presence, gas concentration, wind turbulence, wind speed, changes in wind conditions, and wind current. The atmospheric condition detector 130 may calculate the atmospheric condition via the reflection. For example, a calculation of the height of a cloud may comprise a triangulation and/or travel time.

An atmospheric condition detector 130 comprises a transmitter 132, and a receiver 134. The transmitter 132 transmits energy. For example a light, radio wave or sound wave may be transmitted. The receiver receives 134 a feedback of the energy off atmospheric particles 150, for example clouds. It would be understood that the feedback could be off of other atmospheric particles such as dust, pollen, fog and volcanic aerosols. From the feedback, the atmospheric condition detector 130 is able to detect one or more atmospheric condition.

In an embodiment, the atmospheric condition detector 130 transmits light as the energy. For example, the atmospheric condition detector 130 may comprise a ceilometer, a type of LIDAR, which transmits a light beam or laser. Ceilometers have been used by meteorology and aviation industries.

In an embodiment, the atmospheric condition detector 130 transmits radio waves as the energy. For example, the atmospheric condition detector 130 may comprise radar. Radar has been used by meteorology and aviation industries.

In an embodiment, the atmospheric condition detector 130 transmits sound waves as the energy. For example, the atmospheric condition detector 130 may comprise sonar.

The controller 140 is any device, system or part thereof that controls at least one operation, whether such a device is implemented in hardware, firmware, software or any combination thereof. It should be noted that the functionality associated with any particular controller may be centralized or distributed, whether locally or remotely. A processor and memory may be included in a controller. Further, a controller may correspond to the described data processing system or any other hardware circuit that is operative to control at least one operation. For example a programmable logic controller (PLC) may be used as the controller.

Memory may correspond to an internal or external volatile memory (e.g., main memory, CPU cache, and/or RAM), that is included in a controller and/or in operative connection with the controller. Such a memory may also correspond to a nonvolatile memory (e.g., flash memory, SSD, hard drive, or other storage device or non-transitory computer readable media) in operative connection with the controller.

In an embodiment, the shadow detection system 100 comprises network 160 to enable a communication between the controller 140 and the atmospheric condition detector 130. The controller 140 may be collocated with the atmospheric condition detector 130 or located remotely from atmospheric condition detector 130. The controller 140 may comprise a supervisory control and data acquisition (SCADA).

The shadow detection system 100 may comprises network 161 to enable a communication between the controller 140 and the wind turbine 10.

The term network and derivatives thereof refer to communicatively coupled for the transfer of data. For example, any local, wide area, remote, private, and/or public data processing system network or combination of networks, as known to those of skill in the art, including the Internet may be used. The data transfer may be facilitated by any hardware, wired or wireless medium suitable for the transmission of data. For example, the medium may be metal, air, Ethernet, coaxial cable, optical fiber, or Wi-Fi.

Figure 3:
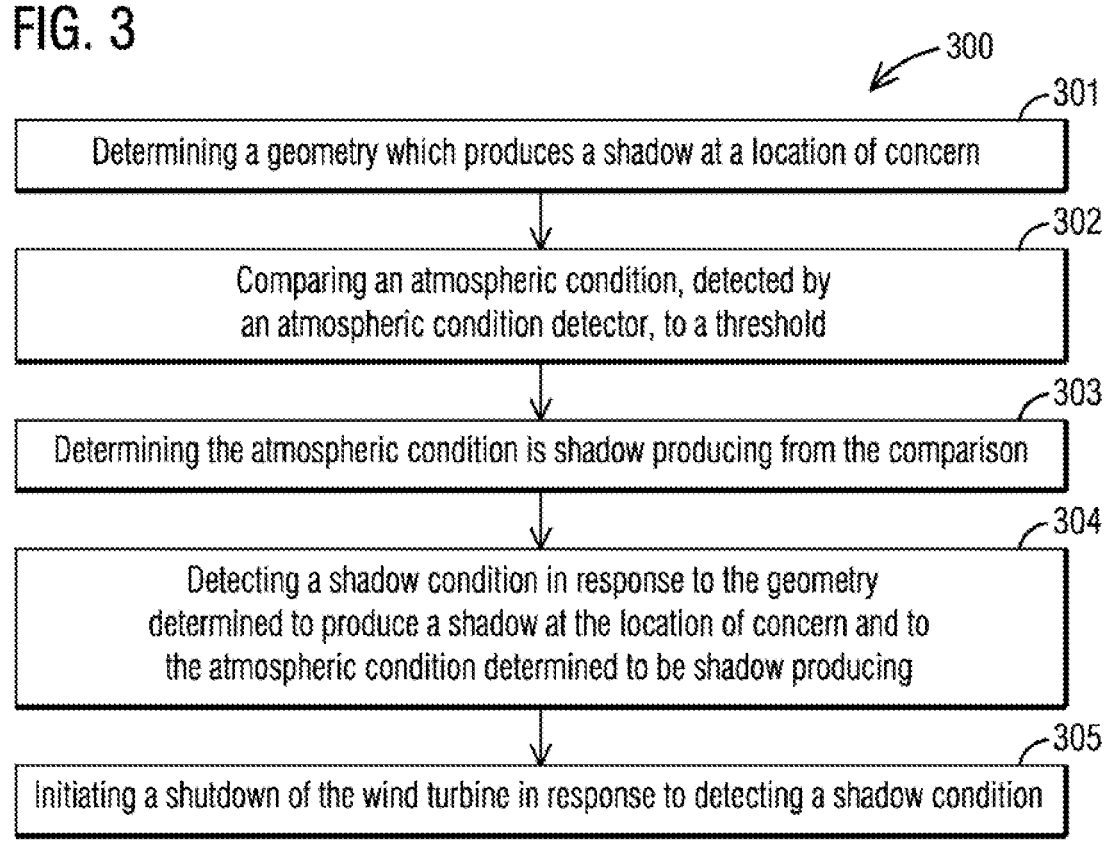
FIG. 3 illustrates a method of operating the wind turbine according to an embodiment.

FIGS. 1 and 2 are used to facilitate the description of a method of detecting a shadow condition of a wind turbine as illustrated in FIG. 3. The method 300 comprises determining a geometry condition is present which is effective to produce a shadow at a location of concern 301; comparing an atmospheric condition detected, by an atmospheric condition detector, to a threshold 302; determine the atmospheric condition is shadow producing from the comparison 303; and detecting a shadow condition in response to the geometry condition determined to produce a shadow at the location of concern and to the atmospheric condition determined to be shadow producing 304.

The location of concern may comprise all or any portion of a location that a shadow is undesirable. For example, it may be undesirable for the shadow to be cast on a window of a building. In response to detecting a shadow condition, the wind turbine may be shut down 305. The location of concern may include more locations other than where the shadow is undesirable or exclude a location where the shadow is undesirable. For example, the operation to shut down the wind turbine may not occur instantly upon detection, the location of concern may include more locations other than where the shadow is undesirable such that the shutdown occurs by the time a shadow would be cast on the undesirable location The positions of the sun that can produce the shadow are referred herein as threshold positions. The blade swept area is known by those skilled in the art as the area traversed by the blades. The geometry condition is any alignment of the light source, shadow producing element, and the location of concern effective to produce a shadow at the location of concern. Using the position of the location of concern and the position of a blade swept area, positions of the sun to produce a shadow at the location of concern may be calculated. The calculations may be pre-calculated and stored in the controller 140. In contrast, the calculations may be calculated real-time by the controller 140.

The determining the presence of a geometry condition effective to produce a shadow at a location of concern may comprise establishing that a present location of the sun is within the threshold positions. Establishing the present location of the sun may include longitudinal information, time of day, time of year. Furthermore, the establishing the present location may include real-time computation. The establishing the present location may include pre-calculated look up values stored in the controller 140. Similarly the threshold positions may include real-time computation provided by the controller 140.

Detecting an atmospheric condition may comprise transmitting energy via a transmitter 132 and receiving a reflection of the energy off of particles in the atmosphere via a receiver 134. Atmospheric conditions influence the ability of the light source to produce a shadow. Atmospheric conditions may be used in determining when a shadow may be produced via the light source.

clear(low)→few→scattered→broken→overcast (high)

where each range value may indicate the following cloud amounts. The range starting with clear being the least amount of clouds increasing to over cast being the most amount of clouds.

clear: no or virtually no clouds detected.

few: a low number of clouds detected.

scattered: clouds detected not necessarily grouped together.

broken: a significant amount of coverage but not complete coverage.

overcast: no break or substantial break in cloud coverage detected.

In an embodiment, the range value is detected as an atmospheric condition and compared to a threshold. In response to the range value being below the threshold it is determined the atmospheric condition is shadow producing. For example the threshold may be overcast. Any detection of a range value of clear, few, scattered or broken would be below a threshold of overcast and would determine the atmospheric condition is shadow producing. It would be understood that the threshold of overcast is merely an example and any of the range values may be used as the threshold. For example, the threshold may be the range value of broken.

Any other atmospheric conditions may be used in addition to the cloud amount or exclusive of the cloud amount. For example, an amount of backscatter may be used. Similarly to the cloud amount a backscatter amount may have a range from low to high. At the high backscatter amount, the light source may not be able to produce a shadow. In response to the comparison of the determined backscatter amount being below the threshold the shutdown is initiated.

A cloud height or aerosol height may be used. At certain threshold heights it may be that a shadow may be produced but at other threshold heights a shadow would not be produced.

Using an atmospheric condition to detecting the shadow condition removes a need for a sensor for detecting light or a shadow to be mounted on a location of concern such as a building. This alleviates situations of when the operators of the wind turbine do not have access or legal rights to the building.

Detecting the shadow condition using an atmospheric condition removes a need for a sensor for detecting light or a shadow to be mounted on to the wind turbine. Furthermore, detect an atmospheric condition removes any requirement to position a sensor to insure it is able to detect a light quality or to insure multiple sensors or positioned to detect different light quality.

Referring again to FIG. 2, the atmospheric condition detector 130 may be arranged any place relative to the wind turbine 10. For example, the atmospheric condition detector 130 may be arranged remotely to the wind turbine 10. Remotely and its derivatives are defined herein as not mounted either directly or mounted indirectly on the wind turbine. FIG. 2 illustrates a distance d' separating the atmospheric condition detector 130 from the wind turbine 10. In an embodiment, the distance of the atmospheric condition detector 130 from the wind turbine is less than 10 kilometers. In a further embodiment, the distance is less than or equal 5 kilometers. In another embodiment, the distance is less than or equal 3 kilometers.

The detection from a single atmospheric condition detector 130 may be used for a plurality of wind turbines 10. When the detection from a single atmospheric condition detector 130 is used for a plurality of wind turbines 10, the maintenance for such detection is reduced to the single atmospheric condition detector 130 site in contrast to each sensor site.

The method may comprise initiating a shutdown of the wind turbine in response to detecting a shadow condition 305. The initiating may comprise sending a control message to the wind turbine. In an embodiment the control message is sent by the controller 140. A network 161 may be provided to for communication between the controller 140 and the wind turbine 10.

After a shutdown initiation, an initiation of a startup of the wind turbine may occur in response to the shadow condition not being detected or after a designated period of time that the shadow condition is no longer detected.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

What is claimed is:

1. A method of detecting a shadow condition from a wind turbine, the method comprising:
   determining a geometry condition is present which is effective to produce a shadow at a location of concern;
   detecting an atmospheric condition of an atmosphere by an atmospheric condition detector, wherein detecting the atmospheric condition is a function of transmitting energy from the atmospheric condition detector and receiving a reflection of the energy off particles in the atmosphere;
   comparing the atmospheric condition to a threshold;
   determining the atmospheric condition is shadow producing from the comparison; and
   detecting the shadow condition in response to the geometry condition determined to produce the shadow at the location of concern and to the atmospheric condition determined to be shadow producing;
   wherein detecting the atmospheric condition includes detecting one or more atmospheric conditions selected from the group consisting of: an amount of aerosols, an aerosol formation, an amount of clouds, a cloud formation, a height of a cloud or clouds, a structure of the atmosphere, a precipitation, a gas presence, a gas concentration, a wind turbulence, a wind speed, a change in wind direction, and a wind current.

2. The method according to claim 1, wherein the atmospheric condition is a cloud amount, the atmospheric condition is determined to be shadow producing in response to the comparison of the cloud amount being below the threshold.

3. The method according to claim 2, wherein the threshold is at least one of: overcast and broken.

4. The method according to claim 1, initiating a shutdown of the wind turbine in response to detecting the shadow condition.

5. The method according to claim 4, wherein the initiating comprises sending a control message to the wind turbine.

6. The method according to claim 1, wherein the determining the geometry condition comprises establishing a location of a sun and determining the established location is within a threshold position.

7. The method according to claim 1, wherein the atmospheric condition detector includes at least one of: LIDAR, RADAR, and SONAR.

8. The method according to claim 1, wherein the atmospheric condition detector is a ceilometer.

9. The method according to claim 1, wherein the atmospheric condition comprises a height of the clouds or aerosol.

10. A shadow detection system comprising:
    an atmospheric condition detector separated from a wind turbine by a distance; and
    a controller communicatively coupled to the wind turbine by a network and configured for:
    determining a geometry condition is present which is effective to produce a shadow at a location of concern;
    detecting an atmospheric condition of an atmosphere using the atmospheric condition detector, wherein detecting the atmospheric condition is a function of transmitting energy from the atmospheric condition detector and receiving a reflection of the energy off particles in the atmosphere;
    comparing the atmospheric condition to a threshold;
    determining the atmospheric condition is shadow producing from the comparing; and
    detecting a shadow condition in response to the geometry condition determined to produce the shadow at the location of concern and to the atmospheric condition determined to be shadow producing;
    wherein detecting the atmospheric condition includes detecting one or more atmospheric conditions selected from the group consisting of: an amount of aerosols, an aerosol formation, an amount of clouds, a cloud formation, a height of a cloud or clouds, a structure of the atmosphere, a precipitation, a gas presence, a gas concentration, a wind turbulence, a wind speed, a change in wind direction, and a wind current.

11. The shadow detection system according to claim 10, wherein the atmospheric condition is a cloud amount, the atmospheric condition is determined to be shadow producing in response to the comparing of the cloud amount being below the threshold.

12. The shadow detection system according to claim 11, wherein the threshold is at least one of overcast and broken.

13. The shadow detection system according to claim 10, wherein the atmospheric condition detector is located remotely at a distance from the wind turbine.

14. The shadow detection system according to claim 10, wherein the atmospheric condition detector is a ceilometer.

15. A wind turbine farm, comprising:
    a plurality of wind turbines; and
    the shadow detection system according to according to claim 10 for detecting shadows for each of the plurality of wind turbines.

16. The wind turbine farm according to claim 15, wherein the atmospheric condition detector is located remotely at a distance from at least one of the plurality of wind turbines.

* * * * *